US010852534B2

(12) United States Patent
Scholl et al.

(10) Patent No.: US 10,852,534 B2
(45) Date of Patent: Dec. 1, 2020

(54) MIRROR ASSEMBLIES FOR IMAGING DEVICES

(71) Applicant: FARO Technologies, Inc., Lake Mary, FL (US)

(72) Inventors: Matthias Scholl, Weilimdorf (DE); Christoph Neundorf, Langewiesen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 281 days.

(21) Appl. No.: 15/963,522

(22) Filed: Apr. 26, 2018

(65) Prior Publication Data
US 2019/0331911 A1   Oct. 31, 2019

(51) Int. Cl.
*G02B 26/08*   (2006.01)
*G02B 26/10*   (2006.01)
*G01S 7/481*   (2006.01)
*G02B 5/08*   (2006.01)

(52) U.S. Cl.
CPC .......... *G02B 26/105* (2013.01); *G01S 7/4817* (2013.01); *G02B 5/0858* (2013.01)

(58) Field of Classification Search
CPC .... G02B 26/105; G02B 5/0858; G01S 7/4817

USPC ...................................... 359/201.2
See application file for complete search history.

(56) References Cited

U.S. PATENT DOCUMENTS

| 4,597,630 A * | 7/1986 | Brandstetter | G03H 1/06 359/11 |
| 5,184,245 A * | 2/1993 | Murakami | G02B 7/1821 359/196.1 |
| 9,778,037 B2 | 10/2017 | Bestler et al. | |
| 2006/0291022 A1 * | 12/2006 | Redmond | G02B 17/023 359/15 |

OTHER PUBLICATIONS

Marshall et al."Handbook of Optical and Laser Scanning", Second Edition, CRC Press, Taylor & Francis Group, Boca Raton, FL, 2012, Reprint (2018) 5 pages.

* cited by examiner

*Primary Examiner* — Euncha P Cherry
(74) *Attorney, Agent, or Firm* — Canton Colburn LLP (57) ABSTRACT

Imaging devices and mirror assemblies for imaging devices are provided. The mirror assemblies include a first portion having a first cut face and formed of a transparent material, a second portion having a second cut face and formed of the transparent material, wherein the second cut face is assembled to the first cut face form a main body, and at least one reflective surface positioned between the first and second cut faces.

24 Claims, 7 Drawing Sheets

MIRROR ASSEMBLIES FOR IMAGING DEVICES

BACKGROUND

The subject matter disclosed herein relates to systems and methods for measuring three-dimensional (3D) coordinates of a scanned environment, and in particular, to mirror assemblies for use in 3D scanning systems.

A 3D imager is a portable device having a projector that projects light patterns on the surface of an object to be scanned. On such noncontact device may include time-of-flight techniques to be used to measure 3D coordinates (e.g. laser trackers, laser scanners, time-of-flight cameras, etc.). These devices emit a light beam and measure the amount of time it takes for light to travel to the surface and return to the device to determine the distance. Typically, the time-of-flight scanner is stationary and includes mechanisms to rotate about two orthogonal axis to direct the light beam in a direction. By knowing the distance and the two angles, 3D coordinates may be determined.

Some types of time-of-flight systems use rotating mirrors to reflect a projector or emitted electromagnetic radiation beam (e.g., a laser) and to reflect a returned electromagnetic radiation beam. The mirror is typically positioned relative to an electromagnetic radiation and a detector or sensor such that an emitted beam will be transmitted from the device, reflected off a surface within a scanned environment, and then return to the sensor/detector. The mirror may be angularly rotated by either a galvometer or a high speed motor. For systems that rotate the mirror 360 degree at high speed, the use of these high revolution per minute systems has constrained the packaging configurations thereof. For example, rotations of about 6,000 RPM may be used during scanning using time-of-flight systems. The forces applied to the components of the system (e.g., the mirror) can limit the manufacture and packaging arrangement thereof. Accordingly, improved systems may be beneficial and provide more packaging flexibility and reduced manufacturing costs.

BRIEF SUMMARY OF THE INVENTION

According to some embodiments, mirror assemblies are provided. The mirror assemblies include a first portion having a first cut face and formed of a transparent material, a second portion having a second cut face and formed of the transparent material, wherein the second cut face is assembled to the first cut face form a main body, and at least one reflective surface positioned between the first and second cut faces.

In addition to one or more of the features described above, or as an alternative, further embodiments of the mirror assemblies may include a first mounting assembly engaged with an end of the first portion opposite the first cut face, wherein the first mounting assembly is arranged to engage within an image scanner.

In addition to one or more of the features described above, or as an alternative, further embodiments of the mirror assemblies may include that the first mounting assembly includes a support element and a bearing element, wherein the support element engaged with the first portion.

In addition to one or more of the features described above, or as an alternative, further embodiments of the mirror assemblies may include that the first portion comprises an engagement surface that engaged the first portion to the first mounting assembly.

In addition to one or more of the features described above, or as an alternative, further embodiments of the mirror assemblies may include that the first mounting assembly is configured for engagement with a driving element to enable rotation of the at least one reflective surface.

In addition to one or more of the features described above, or as an alternative, further embodiments of the mirror assemblies may include a second mounting assembly engaged with an end of the second portion opposite the second cut face, wherein the second mounting assembly is arranged to engage within an image scanner.

In addition to one or more of the features described above, or as an alternative, further embodiments of the mirror assemblies may include that the first portion comprises a first window, wherein the mirror is arranged such that light can pass through an end of the first portion, reflect off the mirror, and pass through the first window.

In addition to one or more of the features described above, or as an alternative, further embodiments of the mirror assemblies may include that the second portion comprises a second window, wherein the at least one reflective surface is arranged such that light may pass through an end of the second portion, reflect off the at least one reflective surface, and pass through the second window.

In addition to one or more of the features described above, or as an alternative, further embodiments of the mirror assemblies may include that the at least one reflective surface is formed from at least one of a metallic coating and a di-electric coating.

In addition to one or more of the features described above, or as an alternative, further embodiments of the mirror assemblies may include that curved surfaces of the cylindrical body are at least one of treated, coated, and covered with absorbing material.

In addition to one or more of the features described above, or as an alternative, further embodiments of the mirror assemblies may include that the first portion is attached to the second portion using at least one of glue, adhesive, optical bonding, mechanical clamps, and mechanical fasteners.

According to some embodiments, imaging devices are provided. The imaging devices include a housing and a mirror assembly installed within the housing. The mirror assembly includes a first portion having a first cut face and formed of a transparent material, a second portion having a second cut face and formed of the transparent material, wherein the second cut face is assembled to the first cut face form a main body, and at least one reflective surface positioned between the first and second cut faces.

In addition to one or more of the features described above, or as an alternative, further embodiments of the imaging devices may include a first mounting assembly engaged with an end of the first portion opposite the first cut face, wherein the first mounting assembly is arranged to engage within the housing.

In addition to one or more of the features described above, or as an alternative, further embodiments of the imaging devices may include that the first mounting assembly includes a support element and a bearing element, wherein the support element engaged with the first portion.

In addition to one or more of the features described above, or as an alternative, further embodiments of the imaging devices may include that the first portion comprises an engagement surface that engaged the first portion to the first mounting assembly.

In addition to one or more of the features described above, or as an alternative, further embodiments of the imaging devices may include that the first mounting assembly is configured for engagement with a driving element to enable rotation of the at least one reflective surface.

In addition to one or more of the features described above, or as an alternative, further embodiments of the imaging devices may include a second mounting assembly engaged with an end of the second portion opposite the second cut face, wherein the second mounting assembly is arranged to engage within an image scanner.

In addition to one or more of the features described above, or as an alternative, further embodiments of the imaging devices may include at least one electromagnetic radiation device arranged to direct electromagnetic radiation at at least one of the first cut face and the second cut face.

In addition to one or more of the features described above, or as an alternative, further embodiments of the imaging devices may include that the first portion comprises a first window, wherein the at least one reflective surface is arranged such that light can pass through an end of the first portion, reflect off the at least one reflective surface, and pass through the first window.

In addition to one or more of the features described above, or as an alternative, further embodiments of the imaging devices may include that the second portion comprises a second window, wherein the at least one reflective surface is arranged such that light may pass through an end of the second portion, reflect off the at least one reflective surface, and pass through the second window.

In addition to one or more of the features described above, or as an alternative, further embodiments of the imaging devices may include that the at least one reflective surface is formed from at least one of a metallic coating and a di-electric coating.

In addition to one or more of the features described above, or as an alternative, further embodiments of the imaging devices may include that curved surfaces of the cylindrical body are at least one of treated, coated, and covered with absorbing material.

In addition to one or more of the features described above, or as an alternative, further embodiments of the imaging devices may include that the first portion is attached to the second portion using at least one of glue, adhesive, optical bonding, mechanical clamps, and mechanical fasteners.

In addition to one or more of the features described above, or as an alternative, further embodiments of the imaging devices may include at least one electromagnetic radiation device arranged to direct electromagnetic radiation at the at least one reflective surface.

In addition to one or more of the features described above, or as an alternative, further embodiments of the imaging devices may include that the at least one electromagnetic radiation device comprises a first electromagnetic radiation device arranged to direct electromagnetic radiation at a first side of the at least one reflective surface and a second electromagnetic radiation device arranged to direct electromagnetic radiation at a second side of the at least one reflective surface.

In addition to one or more of the features described above, or as an alternative, further embodiments of the imaging devices may include that the first electromagnetic radiation device includes a coherent light generator and the second electromagnetic radiation device includes at least one of a color camera, a thermal camera, and a polarization camera.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a mirror assembly, mirror rotors, and imaging devices/system with improved mirror arrangements. Embodiments provided herein are directed to cylindrical bodies formed from two portions with a mirror arranged between the two portions. Accordingly, advantageously, embodiments provided herein enable secure installation of the mirror within an imaging device and further allow for reduced costs and increased safety of such mirrors.

Figure 1A:
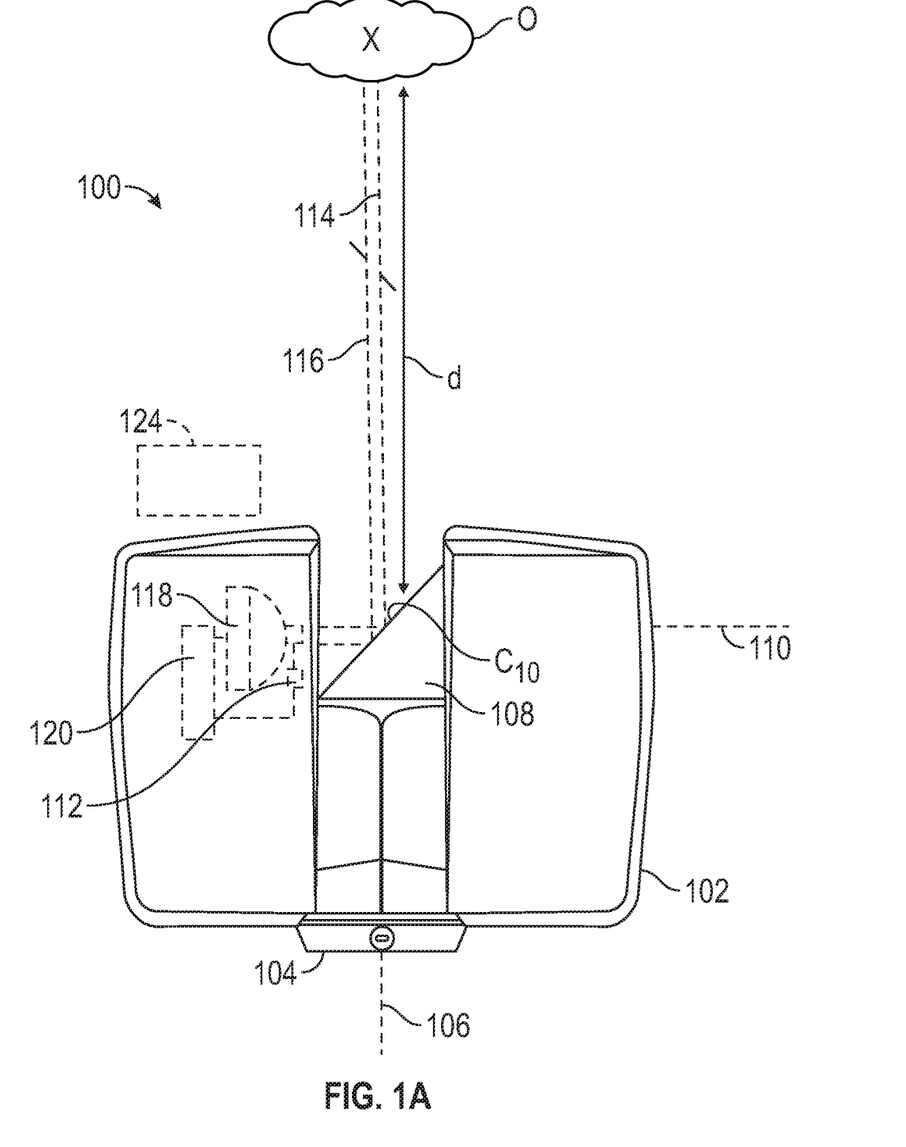
FIG. 1A is a side view of an imaging system that may incorporate embodiments of the present disclosure.
Figure 1B:
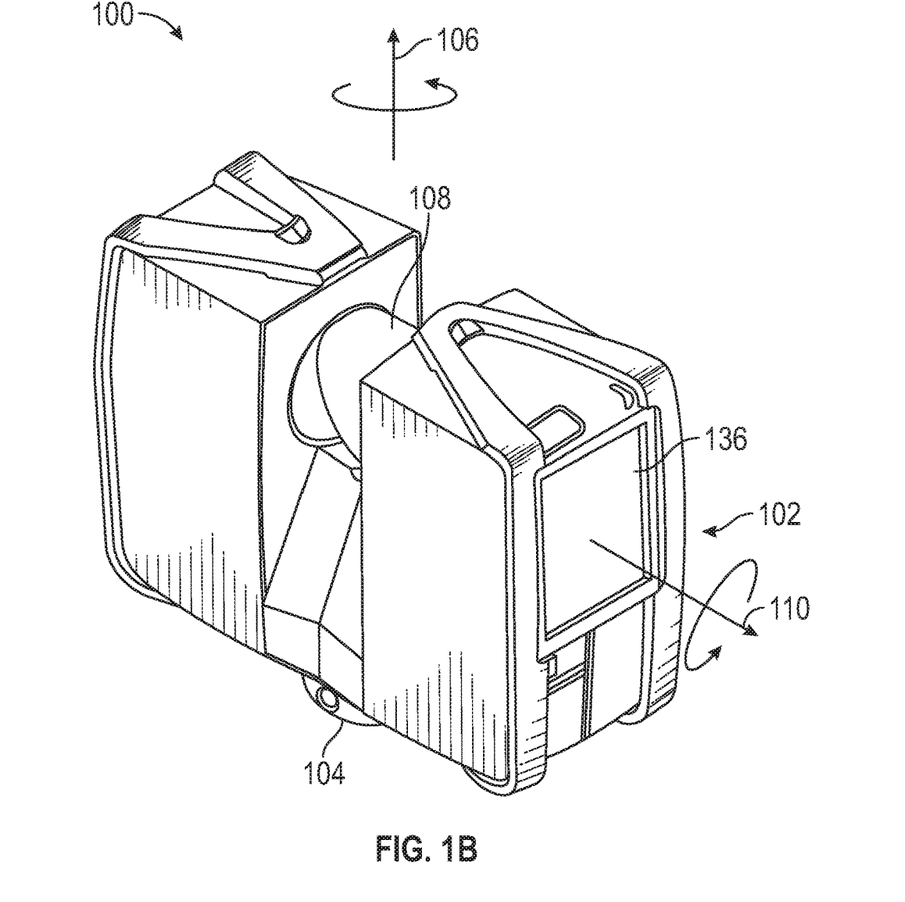
FIG. 1B is a perspective view of the imaging system of FIG. 1A.
Figure 1C:
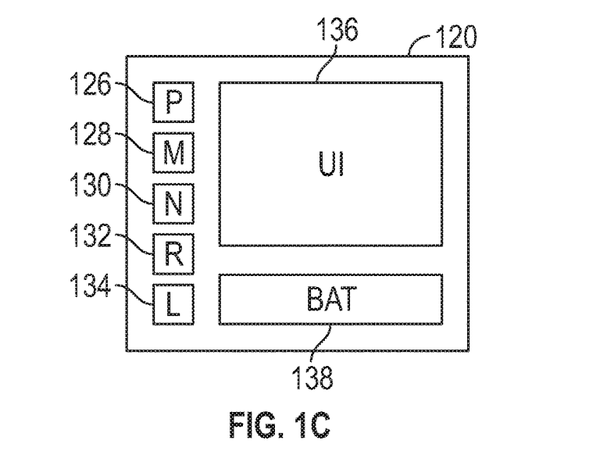
FIG. 1C is a schematic diagram of a controller of the imaging system of FIG. 1A.

Referring now to FIGS. 1A-1C, schematic illustrations of a 3D scanner 100 (e.g., a laser scanner) that can incorporate embodiments of the present disclosure re shown. The 3D scanner 100 may be used for optically scanning and measuring a scanned environment using time-of-flight methods. The 3D scanner 100 includes, as shown, a measuring head 102 and a base 104. The measuring head 102 is mounted to the base 104 such that the measuring head 102 can rotate with respect to the base 104 about a first axis 106. In some embodiments, the rotation of the measuring head 102 may be driven by a first rotary drive (e.g., a motor), as will be appreciated by those of skill in the art. The rotation about the first axis 106 may be about the center of the base 104.

The measuring head 102 includes a mirror 108, which is arranged within the measuring head 102 to rotate about a second axis 110. The rotation of the mirror 108 can be driven by a second rotary drive (e.g., a motor). Referring to a normal upright position of the 3D scanner 100, the first axis 106 may be called the vertical axis or azimuth axis, while the second axis 110 may be called the horizontal axis or zenith axis. The 3D scanner 100 may comprise a gimbal point or center $C_{10}$ that is the intersection point of the first axis 106 and the second axis 110.

The measuring head 102 is provided with an electromagnetic radiation emitter 112, such as light emitter, that emits an emission light beam 114. In an embodiment, the emission light beam 114 may be a coherent light such as a laser beam. As will be appreciated by those of skill in the art, the laser beam may have a wavelength range of approximately 300 to 11320 nanometers, for example, 790 nanometers, 905 nanometers, 1550 nanometers, or less than 400 nanometers. It should be appreciated that other electromagnetic radiation beams having greater or smaller wavelengths may also be used. The emission light beam 114 may be amplitude or intensity modulated, for example, with a sinusoidal waveform or with a rectangular waveform. Alternatively, the emission light beam 114 may be otherwise modulated, for example, with a chirp signal, or coherent receiver methods may be used. In the present embodiment, the emission light beam 114 is a continuous wave laser beam. However, it may also be a pulsed laser. The emission light beam 114 is emitted by the electromagnetic radiation emitter 112 onto the mirror 108, where it is deflected to the environment of the 3D scanner 100.

A reflected light beam, hereinafter called a reception light beam 116, is reflected from the scanned environment by an object O that is within the scanned environment. The reflected or scattered light is intercepted by the rotary mirror 108 and directed onto a light receiver 118 with reception optics. The directions of the emission light beam 114 and the reception light beam 116 result from the angular positions of the measuring head 102 and the mirror 108 about the respective axes 106, 110. The angular positions in turn depend on the corresponding rotary drives. The angle of rotation about the first axis 106 is measured by a first angular encoder. The angle of rotation about the second axis 110 is measured by a second angular encoder.

A controller 120 is coupled to communicate with the electromagnetic radiation emitter 112 and the light receiver 118 inside the measuring head 102. It should be appreciated that while the controller 120 is illustrated as being a single device or circuit, this is for exemplary purposes and the claims should not be so limited. In other embodiments, the controller 120 may be comprised of a plurality of devices or circuits. In some embodiments, a portion of the controller 120 may be arranged outside the measuring head 102, for example, as a computer connected to the base 104 or other components of the 3D scanner 100.

The operation of the 3D scanner 100 is controlled by controller 120. The controller 120 is a suitable electronic device capable of accepting data and instructions, executing the instructions to process the data, and, in some configurations, presenting the results. The controller 120 may accept instructions through user interface, or through other means such as but not limited to electronic data card, voice activation means, manually-operable selection and control means, radiated wavelength and electronic or electrical transfer. The controller 120 may be a microprocessor, microcomputer, a minicomputer, an optical computer, a board computer, a complex instruction set computer, an ASIC (application specific integrated circuit), a reduced instruction set computer, a computer network, a desktop computer, a laptop computer, a scientific computer, a scientific calculator, or a hybrid of any of the foregoing.

The controller 120 is capable of converting an analog voltage or current level provided by sensors (e.g., encoders) into digital signal(s). Alternatively, sensors may be configured to provide a digital signal to the controller 120, or an analog-to-digital (A/D) converter (not shown) maybe coupled between sensors and the controller 120 to convert the analog signal provided by sensors into a digital signal for processing by the controller 120. The controller 120 uses the digital signals act as input to various processes for controlling the 3D scanner 100. The digital signals represent one or more system data including but not limited to angular position about the first axis 106, angular position about the second axis 110, time-of-flight of the light beams 114, 116, and the like.

In general, the controller 120 accepts data from sensors, light emitter 116 and light receiver 118, and is given certain instructions for the purpose of determining three-dimensional coordinates of points in the scanned environment. Further, the controller 120 may compare operational parameters to predetermined variances and if a predetermined variance is exceeded, the controller 120 can generate a signal that may be used to indicate an alarm to an operator. Additionally, the signal may initiate other control methods that adapt the operation of the 3D scanner 100 such as changing or stopping the rotation about the axis 106 once a predetermined angular position is achieved.

In some embodiments, the 3D scanner 100 may optionally include a secondary camera 124 that acquires additional images of a scanned environment. For example, the secondary camera 124 may be a color camera, a thermal camera, a polarization camera, or any other type of camera as desired. In one non-limiting example of using the secondary camera 124, a color camera can generate two dimensional (2D) color images of the scanned environment as a scan is performed by the 3D scanner 100. The 2D images may be synchronized with the acquired 3D coordinate points obtained by the 3D scanner 100. This allows for the association of a color and/or a texture with the 3D coordinate point by the controller 120. In some embodiments, the secondary camera 124 is disposed internally to the 3D scanner 100 and acquires images via the mirror 108, and in other embodiments may be external thereto and connected by means as will be appreciated by those of skill in the art.

In addition to being coupled to one or more components within the 3D scanner 100, controller 120 may also be coupled to external computer networks such as a local area network (LAN) and/or the Internet. A LAN interconnects one or more remote computers, which are configured to communicate with the controller 120 using a well-known computer communications protocol such as TCP/IP (Transmission Control Protocol/Internet Protocol), RS-232, ModBus, and the like. Additional systems may be connected to a LAN with respective controllers. Each of the systems may be configured to send and receive data to and from remote computers and other systems. In some embodiments, the LAN may be connected to the Internet. An Internet connection can allow the controller 120 to communicate with one or more remote computers or other systems connected to the Internet.

In an embodiment, the controller 120 can include various electronic and/or electrical components and elements, as shown in FIG. 1C. The controller 120 may include a processor 126 coupled to a random access memory device 128, a non-volatile memory device 130, a read-only memory device 132, one or more input/output controllers and/or elements as known in the art, and an optional LAN interface device 134 via a data communications bus. In embodiments having a LAN interface device 134, the LAN interface device 134 provides for communication between the controller 120 and a network in a data communications protocol supported by the network. The ROM device 132 can be configured to store an application code, e.g., main functionality firmware, including initializing parameters, and boot code, for the processor 126. Application code also includes program instructions for causing the processor 126 to execute any operation control methods of the 3D scanner 100, including starting and stopping operation, changing operational states of 3D scanner 100, monitoring predetermined operating parameters, generation of alarms, etc. In an embodiment, the application code can create an onboard telemetry system that may be used to transmit operating information between the 3D scanner 100 and one or more remote computers or receiving locations. The information to be exchanged with remote computers and the controller 120 can include but are not limited to 3D coordinate data and images associated with a scanned environment. The controller 120 (or part of the 3D scanner 100) can include a user interface 136, illustratively shown as a display on the side of the measuring head 102 (e.g., shown in FIG. 1B).

The non-volatile memory device 130 may be any form of non-volatile memory such as an EPROM (Erasable Programmable Read Only Memory) chip, a disk drive, or the like. Stored in the non-volatile memory device 130 are various operational parameters for the application code. The various operational parameters can be input to non-volatile memory device 130 either locally, using a user interface 136 or through use of a remote computer, or remotely via the Internet using a remote computer. It will be recognized that application code can be stored in non-volatile memory device 130 or the read-only memory device 132.

The controller 120 includes operation control methods embodied in application code. The methods are embodied in computer instructions written to be executed by the processor 126, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C #, Objective-C, Java, Javascript ALGOL (algorithmic language), BASIC (beginners all-purpose symbolic instruction code), visual BASIC, ActiveX, HTML (HyperText Markup Language), Python, Ruby, and/or, for example, any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In an embodiment, the controller 120 may be configured to process data furnished to generate the 3D scans from data obtained at the light receiver 118 and the controller 120. The 3D scans in turn are joined or registered in a common coordinate frame of reference. For registering, known methods can be used, such as by identifying natural or artificial targets (i.e., recognizable structures within a scanned environment) in overlapping areas of two or more frames. In an embodiment, the multiple frames are dynamically registered using a local bundle adjustment method. Through identification of these targets, the assignment of two 3D scans may be determined by means of corresponding pairs. A whole scene (a plurality of data or frames) is thus gradually registered by the 3D scanner 100. In some embodiments, the data (e.g., individual frames) may be registered to a point cloud generated by a laser scanner.

In an embodiment, the controller 120 further includes an energy source, such as battery 138. The battery 138 may be an electrochemical device that provides electrical power for the controller 120. In an embodiment, the battery 138 may also provide electrical power to the 3D scanner 100 (e.g., electromagnetic radiation emitter 112, light receiver 118, and/or secondary camera 124). In some embodiments, the battery 138 may be separate from the controller 120 (e.g. a battery pack). In an embodiment, a second battery (not shown) may be disposed in the measuring head 102 to provide electrical power to the imaging elements (e.g., electromagnetic radiation emitter 112, light receiver 118, and/or secondary camera 124).

The controller 120 includes operation control methods embodied in application code. The controller 120 is configured to perform operational control methods that determine, for a multitude of measuring points X, a corresponding number of distances d between the 3D scanner 100 and the measuring points X on object O in the scanned environment, as shown in FIG. 1A. The distance to a particular measuring point X is determined based at least in part on the speed of light in air through which electromagnetic radiation propagates from the 3D scanner 100 to the measuring point X In an embodiment, the phase shift in the modulated light beam 114 sent to the measuring point X and received from it (light beam 116), is determined and evaluated to obtain a measured distance d.

The speed of light in air depends on the properties of the air such as the air temperature, barometric pressure, relative humidity, and concentration of carbon dioxide. Such air properties influence the index of refraction of the air. The speed of light in air is equal to the speed of light in vacuum divided by the index of refraction. A laser scanner of the type discussed herein is based on the time-of-flight of the light in the air (i.e., the round-trip time for the light to travel from the device to the object and back to the device). A method of measuring distance based on the time-of-flight of light (or the time-of-flight of any type of electromagnetic radiation) depends on the speed of light in air and is therefore distinguishable from methods of measuring distance based on triangulation.

As noted above, in some embodiments, the measuring head 102 may include a user interface 136 (e.g., display device) integrated into the 3D scanner 100. The user interface 136 can include a graphical touch screen. For example, the user interface 136 may allow an operator to provide measurement instructions to the 3D scanner 100, in particular to set the parameters or initiate the operation of the 3D scanner 100, and the user interface 136 may also display measurement results.

In an embodiment, the scanning of a scanned environment by the 3D scanner 100 may take place by rotating the mirror 108 relatively quickly about the second axis 110 while rotating the measuring head 102 relatively slowly about the first axis 106, thereby moving the 3D scanner 100 in a spiral pattern. In a non-limiting example, the rotary mirror 108 may be driven to rotate at a maximum speed of about 6000 revolutions per minute. A scan is defined to be the entity of measuring points X in such a measuring. For such a scan, the center $C_{10}$ defines the origin of the local stationary reference system. The base 104 rests in this local stationary coordinate frame of reference.

In addition to measuring a distance d from the center $C_{10}$ to a measuring point X on the object O (as shown in FIG. 1A), the 3D scanner 100 may also collect gray-scale values related to a received optical power. The gray-scale value may be determined, for example, by integration of a band-pass-filtered and amplified signal in the light receiver 118 over a measuring period attributed to the measuring point X In some embodiments, color images can be generated by the secondary camera 124. Through use of these color images, colors (R, G, B) or texture can be assigned to the measuring points X as additional values.

A rotor system (e.g., electromagnetic motor system) is used to spin or rotate the mirror within the measuring head, as will be appreciated by those of skill in the art (e.g., at about 6000 RPM). To enable such fast rotation, the rotor may be a certain length to enable balancing of the weight of the mirror during such rotation. A bearing system may support a mirror support upon which the mirror is attached. The mirror support is rotated within the bearing system by the rotor system.

Figure 2:
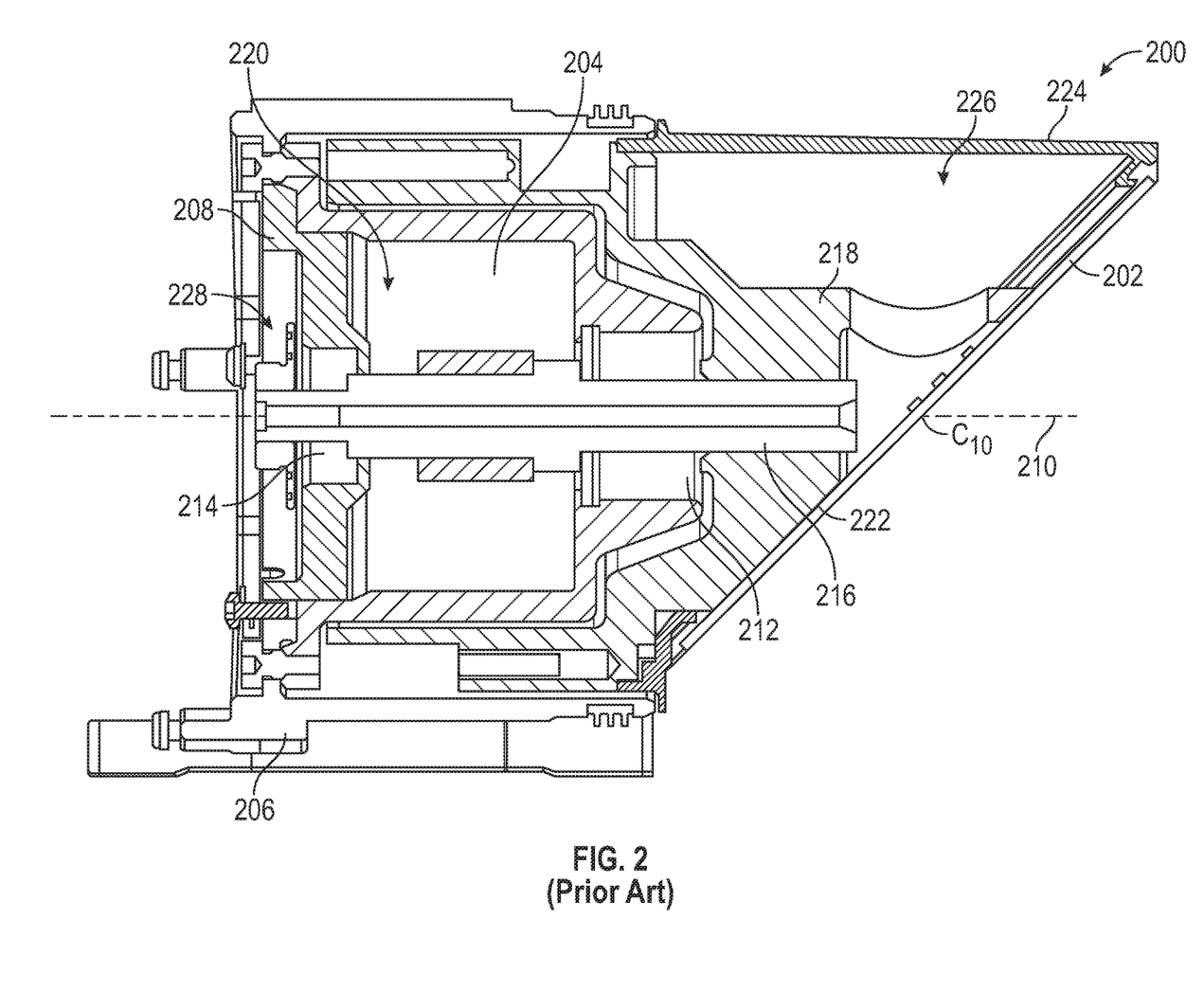
FIG. 2 is a schematic illustration of a prior art mirror arrangement for use in imaging systems.

As shown in FIG. 2, a mirror assembly 200 for use in a 3D scanner is schematically shown. The mirror assembly includes a mirror 202 that is angled to enable imaging as described above. An electric motor 204 is arranged to drive rotation of the mirror 202. The motor 204 has a drive housing 206 which is fixedly connected to or part of a measuring head, such as shown above. The drive housing 206 has approximately the shape of a horizontal hollow cylinder and is arranged for engagement within a measuring head of a 3D scanner. A motor housing 208 is arranged within the drive housing 206. The motor housing 208 may be configured to be rotationally symmetrical to a mirror axis 210 (e.g., the second axis 110 shown in FIGS. 1A-1B) and arranged around said mirror axis 210. The motor housing 208 is attached at one end to the drive housing 206 and is otherwise spaced from an inner wall of drive housing 206, producing an annular receiving space in drive housing 206.

At least two bearings 212, 214 are positioned within the motor housing 208 and support a shaft 216. The shaft 216 is rotatable about the mirror axis 210 (and defines said mirror axis 210). In some embodiments, various bearings arrangements may be employed, as will be appreciated by those of skill in the art. For example, in some non-limiting embodiments, the bearings 212, 214 may be axially fixed against one another with one being a spring preloaded bearing so that the stiffness of the bearing arrangement is not position-dependent. A rotary support structure 218 may be arranged on the shaft 216 and project out of drive housing 206. The rotary support structure 218 is at least co-rotatably connected to the shaft 216, and mounted thereon.

The rotary support structure 218 has an interior region 220 configured to receive the electric motor 204 therein. The rotary support structure 218 includes a slanted section having an angled surface 222. The slanted section of the rotary support structure 218 can be inscribed within a cylinder that has been truncated at an angle of 45° (relative to second axis 210) and defining the angled surface 222. The mirror 202 is supported on the angled surface 222. The mirror 202 may be attached, for example, by glue, adhesive, optical bonding, mechanical clamps, mechanical fasteners (e.g., screws), or otherwise affixed to the angled surface 222. As shown, a faceplate 224 is attached to rotary support structure 218, overlapping an edge of the mirror 202 and defining a recess 226.

An angular position sensor 228 is arranged on an end of the shaft 216 to enable monitoring angular position of the shaft 216. Between the bearings 212, 214 is the electric motor 204, which may include stator and rotor elements. For example, a stator element may be arranged to drive rotation of rotor elements that are connected to or part of the shaft 216 to rotate the shaft 216 and/or the support structure 218, and thus rotate the mirror 202. Despite the asymmetrical shape, the rotary support structure 218 together with other components including the mirror 202, is at least approximately (perpetually) balanced.

As shown in FIG. 2, the mirror assembly 200 is physically supported on one side, allowing for the mirror 202 to be mounted and positioned relative to a light source and thus enable scanning. To obtain accurate scans, the balancing of the mirror assembly is important. For example, during rotation of the mirror assembly 200, the forces of the system may result in instability and/or loss of the mirror 202. Accordingly, improved mirror assemblies for 3D scanners may be desirable.

Embodiments of the present disclosure are directed to mirrors and mirror assemblies for 3D scanners, and in some embodiments may be mirrors arranged within a cylindrical main body. The mirrors within a main body enable a robust and balanced mirror assembly for use with 3D scanners.

Figure 3A:
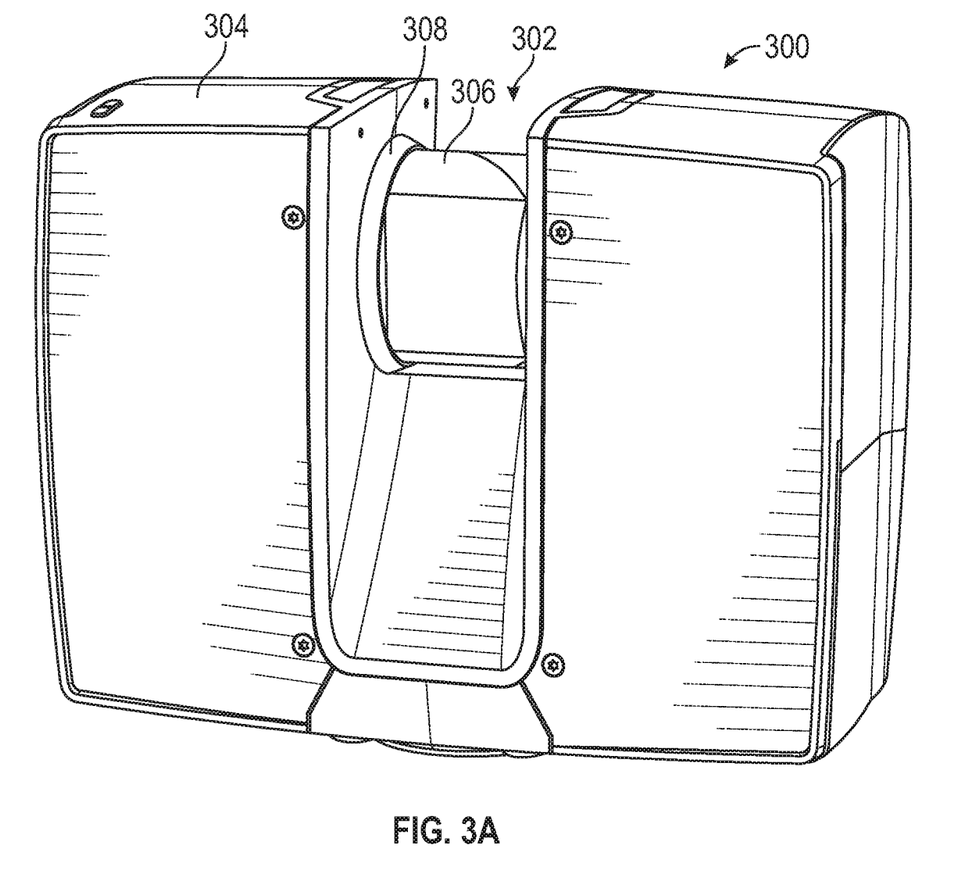
FIG. 3A is a schematic illustration of an imaging device in accordance with an embodiment of the present disclosure.
Figure 3B:
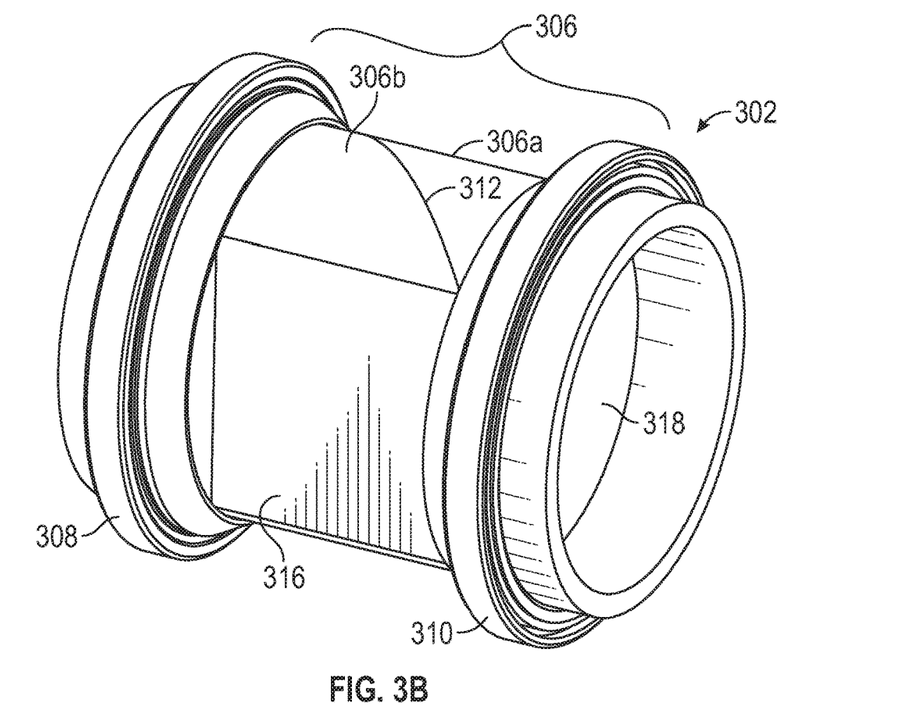
FIG. 3B is a schematic illustration of a mirror assembly of the imaging device of FIG. 3A.
Figure 3C:
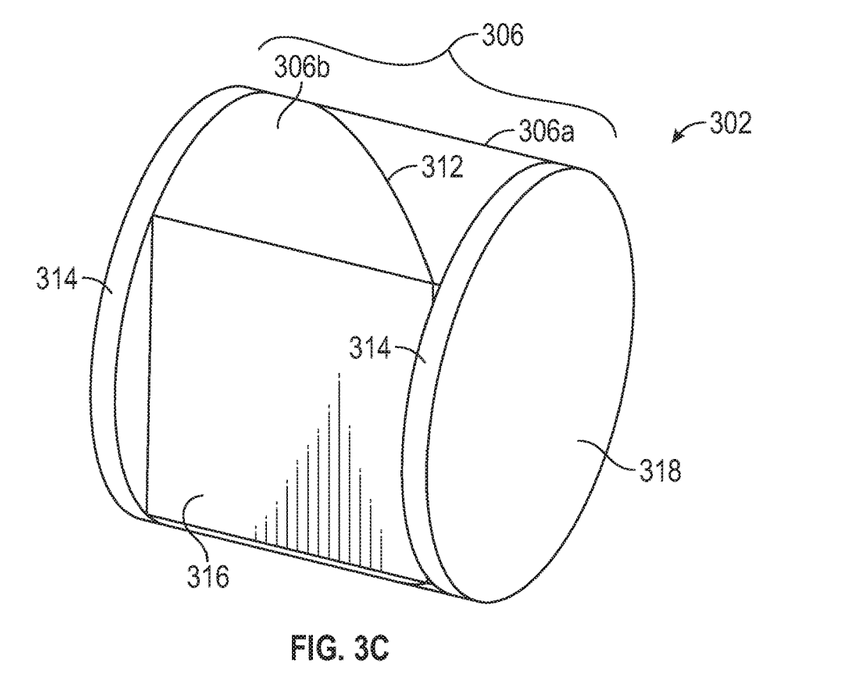
FIG. 3C is a schematic illustration of a main body of the imaging device of FIG. 3A.

For example, turning now to FIGS. 3A-3B, schematic illustrations of an imaging device 300 in accordance with an embodiment of the present disclosure are shown. FIG. 3A is an isometric illustration of the imaging device 300 having a mirror assembly 302 installed in a housing 304. FIG. 3B is an isometric illustration of the mirror assembly 302 as removed from the housing 304 and illustrating features thereof. FIG. 3C is another isometric illustration of the mirror assembly 302.

The housing 304 may be similar to that shown and described above with respect to the measuring head of FIGS. 1A-1B. The housing 304 may include various components therein including, but not limited to, electronics, processors, control elements, power sources, bearings, light source(s), light receptors, etc. such as described above.

The mirror assembly 302 includes a main body 306 (e.g., a mirror rotor) and a mounting assembly 308. Although shown in FIG. 3A with a single mounting assembly 308, a second mounting assembly 310 is positioned at an opposing end of the main body 306, as shown in FIG. 3B). The main body 306 is mounted within the mounting assembly 308, 310 and secured such that rotation of the mounting assembly 308, 310, or a portion thereof, enables rotation of the main body 306.

The main body 306 is formed from a first portion 306a and a second portion 306b which define a main body when assembled, and in this example embodiment form a cylindrical main body. The first and second portions 306a, 306b are separate elements that, when joined, form the complete main body 306. A mirror 312 is located between the first portion 306a and the second portion 306b. Although the term "mirror" is used herein, those of skill in the art will appreciate that the term, and elements referred to as a "mirror" may include any reflective surface, and is not limited to mirrors in the traditional sense.

At least one of the first portion 306a and the second portion 306b is optically transparent to allow for electromagnetic radiation (e.g., light) to pass therethrough. In some embodiments, both the first portion 306a and the second portion 306b are optically transparent, as described herein. The main body 306, as shown in FIG. 3C, includes engagement surfaces 314 for engagement with the mounting assemblies 308, 310. The engagement surfaces 314 may be surfaces or edges of the material of the first and second portions 306a, 306b or may be a material or component applied or attached to the first and second portions 306a, 306b.

In one non-limiting embodiment, the main body 306 is a glass cylinder that is cut in half, at a 45° angle, as described below. The 45° cut separates the main body 306 into the first and second portions 306a, 306b. When separated, at least one of the first and second portions 306a, 306b is treated to form a mirror surface on the 45° surface thereof. Once applied, the first and second portions 306a, 306b are rejoined together to form the main body 306 having the mirror 312 therein. Thus, the arrangement in FIG. 3C is assembled.

Once joined, the first and second mounting assemblies 308, 310 can then be installed or attached such that the main body 306 is engaged between the first and second mounting assemblies 308, 310, as shown in FIG. 3B. The first and second mounting assemblies 308, 310 include structure for engagement within the housing 304. For example, a slotted engagement can be provided to insert the assembly mirror assembly 302 (shown in FIG. 3B) into the housing 304. The mounting assemblies 308, 310, in some embodiments, may also provide a clamping force to ensure the first portion 306a and the second portion 306b are held together.

Further, as shown in FIGS. 3B-3C, at least one of the first portion 306a and the second portion 306b include a window 316. The window 316 is a flat surface of the respective first or second portion 306a, 306b and arranged to allow electromagnetic radiation beams to pass therethrough without interfering therewith. The window 316 is an exterior surface cut face that is planar and parallel to the axis of rotation.

Thus, the window 316 is an exterior surface of the respective first or second portion 306a, 306b that is arranged at a 45° angle relative to the mirror 312. Accordingly, electromagnetic radiation beams can be transmitted from a source within the housing 304, through an end surface 318 of the main body 306, reflect off the mirror 312, and exit through the window 316. Any reflected light from an external object or surface may be reflected back through the window 316, reflect off the mirror 312, and through the end surface 318 of the main body 306 to a sensor or detector located within the housing 304. Accordingly, the mirror assembly 306 can operate substantially similarly to the mirror assembly shown in FIG. 2, but may be more robust due to the construction and assembly within the housing 304. For example, the main body 306 is a solid body and thus may be balanced easily without the need for complex balancing features within the housing, at a mounting assembly or support assembly, or associated with the mirror itself. Further, the main body 306 is engaged at both ends with the respective mounting assemblies 308, 310. Thus, physical support and engagement of the main body 306 is achieved at both ends providing additional support, stability, rigidity, and balance to the system.

In one non-limiting example, the main body (e.g., mirror rotor) is a cylindrical rotor made of glass. In some embodiments, the glass cylinder is cut into two pieces such that each piece has a cut face, e.g., forming angled cut faces. In some embodiments, the cut faces may be at of 45° although other angles may be employed without departing from the scope of the present disclosure. One or both of the pieces may be coated on the cut face to form or generate a mirrored or reflective surface. The two pieces may then be reassembled (e.g., glued) together to again form the cylinder. The formed cylinder is an axially symmetric body that may be nearly perfectly balanced.

In one embodiment, the two cut faces (e.g., the cut face of each portion) may be coated to achieve a specific function. For example, one of the two cut faces may be treated with a coating to reflect a laser beam and the other of the two cut faces may be treated with a coating to reflect visible light. The application of the coatings may be such that when the two portions are assembled to form the cylinder the reflective surfaces are facing in opposing directions. In such embodiment, two windows (e.g., window 316 shown in FIGS. 3B-3C) may be formed to allow for the passage of the respective electromagnetic radiation therethrough. Accordingly, the visible and laser light may be reflected in opposite directions as the main body rotates. To accommodate such arrangement, the housing or measuring head may be arranged with electromagnetic radiation sources on opposing sides thereof and arranged to project respective radiation toward the mirror rotated in between the sources. Respective electromagnetic radiation sensors would be arranged to receive the same reflected or returned electromagnetic radiation (or opposing electromagnetic radiation depending on the specific configuration). In alternative embodiments, a single cut face may be treated with a material or coating to reflect multiple different electromagnetic radiation beams (e.g., laser and visible).

In some embodiments, the coating may be a metallic coating applied to the cut faces. It is noted that current arrangements (e.g., as shown in FIG. 2) cannot employ metallic mirrors due to the mechanical resistance of such mirrors (as compared to current mirrors). However, such mirrors may be formed from silicon carbide materials, which may increase costs of such systems. In contrast, relatively low cost metallic mirrors may be used with the mirror assemblies of the present disclosure, thus reducing costs. In other embodiments, alternative coatings may be employed, including, but not limited to di-electric coatings.

In some embodiments, the faces or surfaces of the main body that have electromagnetic radiation beams pass therethrough may be treated to reduce, minimize or eliminate reflection, refraction, etc. Further, in embodiments where the main body forms a cylinder, the curved surfaces of the main body may be treated, coated, or covered with absorbing material to reduce or eliminate the effects of a cylindrical lens.

Figure 4:
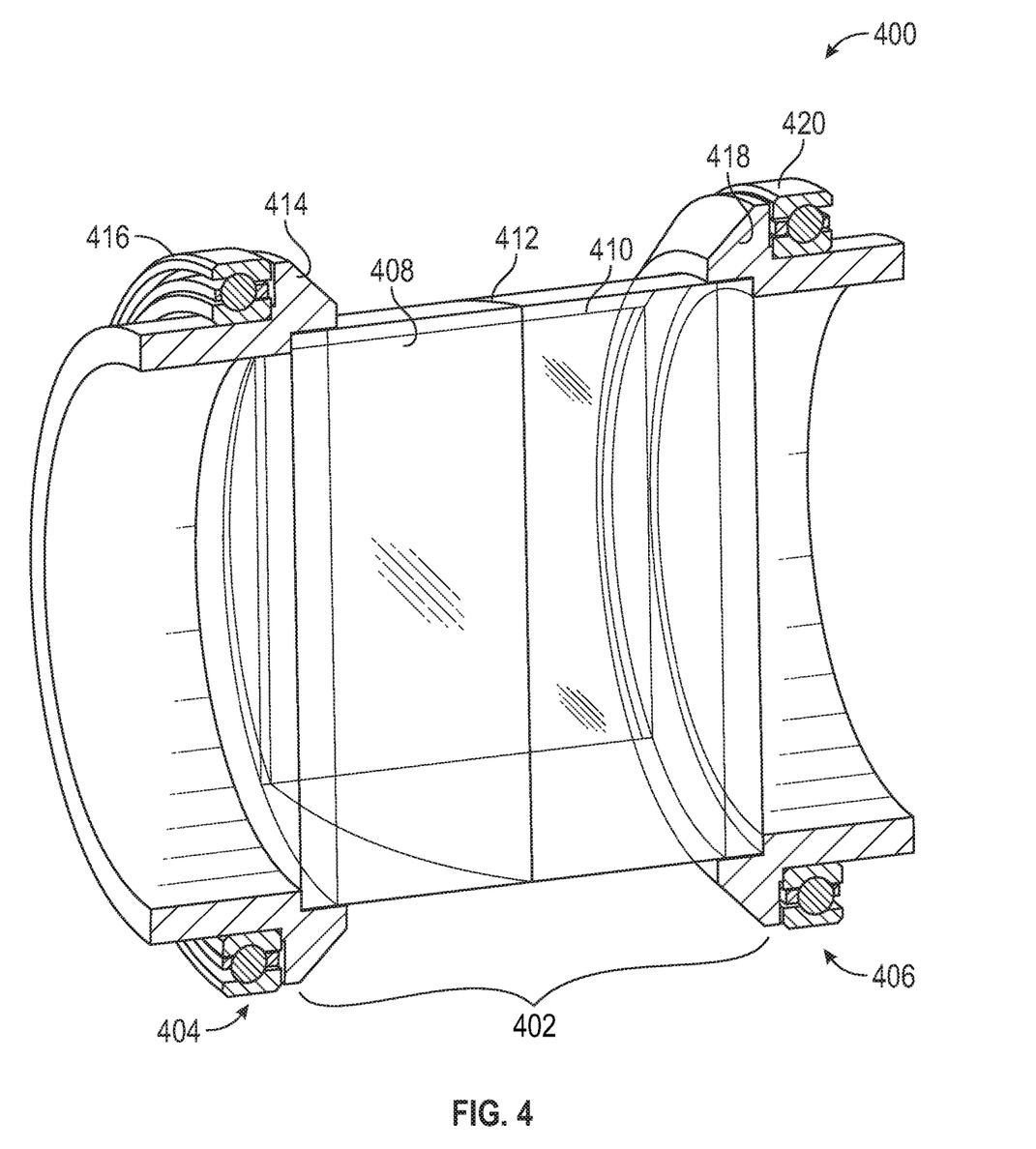
FIG. 4 is a cross-sectional illustration of a mirror assembly in accordance with an embodiment of the present disclosure.

Turning now to FIG. 4, a cross-sectional illustration of a mirror assembly 400 in accordance with an embodiment of the present disclosure is shown. The mirror assembly 400 is similar to that shown and described above with respect to FIGS. 3A-3C, with a main body 402 engaged between a first mounting assembly 404 and a second mounting assembly 406. The mirror assembly 400 is arranged to be mounted within a housing or measuring head and to be rotatably driven or spun, as described above.

The main body 402 includes a first portion 408 and a second portion 410 with a mirror 412 located therebetween. The first portion 408 is arranged to engage with the first mounting assembly 404 and the second portion 410 is arranged to engage with the second mounting assembly 406. As shown, the first mounting assembly 404 includes a first support element 414 and a first bearing element 416. Similarly, the second mounting assembly 406 includes a second support element 418 and a second bearing element 420.

The support elements 414, 418 are arranged to securely engaged with and hold the first and second portions 408, 410 therebetween, and thus support the main body. The bearing elements 416, 420 allow for rotation of the support elements 414, 418 (and thus rotation of the main body 402). One or both of the support elements 414, 418 can be engaged by a motor assembly to drive rotation of the main body 402.

Figure 5:
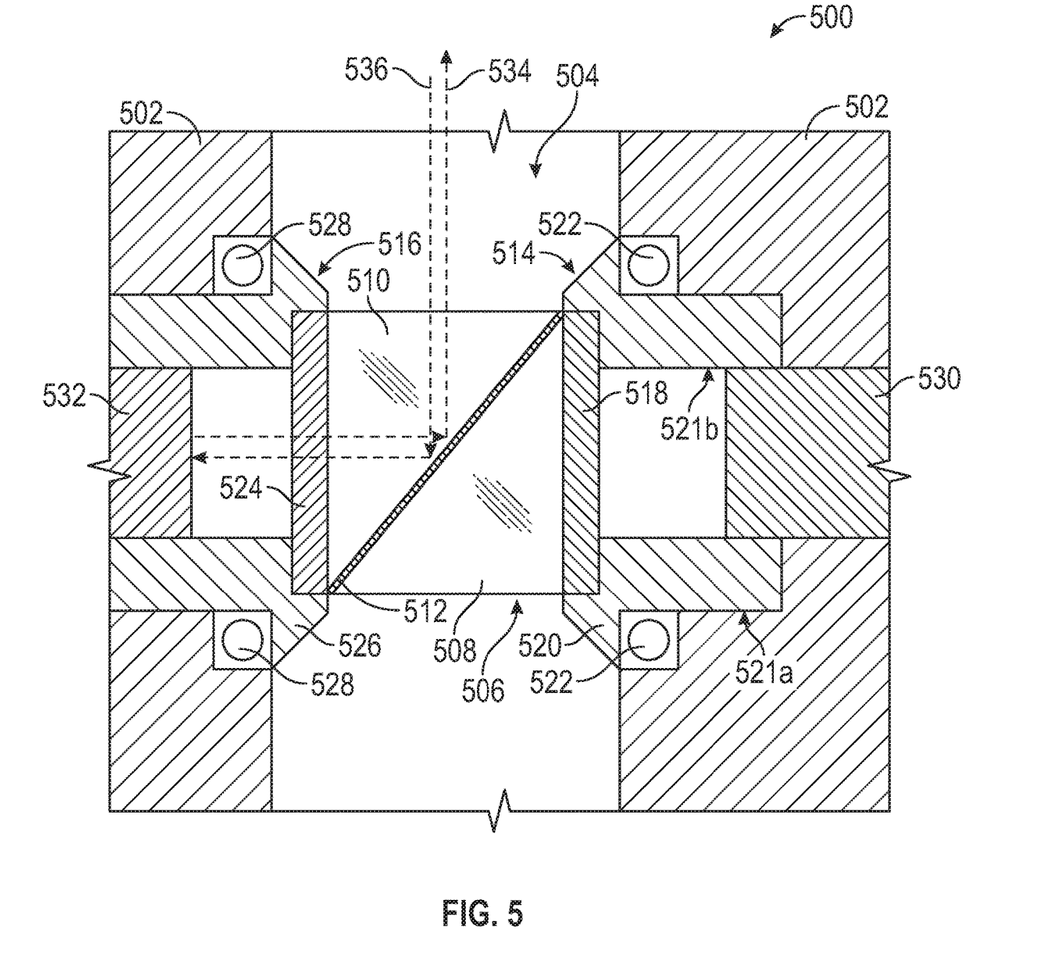
FIG. 5 is a cross-sectional illustration of a part of an imaging device in accordance with an embodiment of the present disclosure.

Turning to FIG. 5, a schematic illustration of portion of an imaging device 500 in accordance with an embodiment of the present disclosure is shown. The imaging device 500 includes a housing 502 with a mirror assembly 504 installed therein. The mirror assembly 504 may be similar to the embodiments shown and described above. As such, the mirror assembly 504 includes a main body 506 having a first portion 508 and a second portion 510 with a mirror 512 located therebetween. The main body 506 is a cylindrical structure, such as shown and described above. The main body 506 is supported within the housing 502 by a first mounting assembly 514 at a first end and by a second mounting assembly 516 at a second end. The mirror 512 is angled at 45° and positioned on or between cut faces of the first and second portions 508, 510.

The first portion 508 includes a first engagement surface 518 that engages with a first support element 520 of the first mounting assembly 514. A first bearing element 522 of the first mounting assembly 514 is arranged to provide movable engagement between the first mounting assembly 514 and the housing 502. The second portion 510 includes a second engagement surface 524 that engages with a second support element 526 of the second mounting assembly 516. A second bearing element 528 of the second mounting assembly 516 is arranged to provide movable engagement between the second mounting assembly 516 and the housing 502.

A driving element 530 is arranged within the housing 502 and is configured to drive rotation of the main body 506. As shown, the driving element 530 is engaged with the first support element 520 of the first mounting assembly 514. The driving element 530 may be a motor, drive shaft, stator/rotor configuration, or have other arrangement as provided by those of skill in the art. In one non-limiting embodiment, the driving element 530 may be a frameless motor. Such a frameless motor may be mounted to the outer diameter 521a of the first support element 520. It should be appreciated that such an arrangement would allow the placement of a device, such as a camera or a light emitting device within the space defined by the inner diameter 521b of the first support element 520 (or directly adjacent the opening). For example, in one non-limiting example, the secondary camera 124, shown in FIG. 1A, may be positioned internally to receive light reflected off of the backside of mirror 512.

Further, as shown, in the housing 502 and on the opposite side of the main body 506 from the driving element 530 is an electromagnetic radiation device 532. The electromagnetic radiation device 532 is arranged to emit an emission beam 534 and also detect a returned reception beam 536.

Although shown in FIG. 5 with the driving element 530 and the electromagnetic radiation device 532 positioned on opposing sides, various other arrangements are possible without departing from the scope of the present disclosure. For example, each of the elements 530, 532 shown in FIG. 5 can include both a driving element and an electromagnetic radiation device, or one may comprise both a driving element and an electromagnetic radiation device and the other may comprise only an electromagnetic radiation device. In some such embodiments, two or more different electromagnetic radiation beams may be emitted and received to enable different types of scanning (e.g., distance by laser, and visible spectrum scan). Further, the mirror 512 shown in FIG. 5 can include a dual-faced mirror with one mirror or reflective surface facing element 532 and the other mirror or reflective surface facing element 530, thus enabling two or more different types of imaging. Accordingly, in some embodiments, one or more mirrors or reflective surfaces may be arranged between the first portion 508 and the second portion 510.

Technical effects include scanning devices having a mirror that is securely installed within the device, with mounting on two sides thereof. For example, embodiments provided herein enable the placement of bearings on both ends of a main body or mirror rotor. Such arrangement enables low cost mirrors, installed between two portions of a main body (e.g., mirror rotor, cut cylinder, etc.). Further, such arrangement enables the use of multiple different scanning types (e.g., different wavelengths) by enabling customized mirrors and/or multiple mirrors (two-sided). The cut of the two portions is angled to prevent back reflection while optimizing reflection out of the device to interact with an external environment.

Surfaces of the main body may be arranged to be flat surfaces that are normal to the direction of incident radiation. Further, surfaces that are curved may be treated to minimize interference with the radiation that passes through the main body. The cylindrical shape of the main body of the present disclosure improves air resistance interactions as the mirror rotates.

In some embodiments, the mirror of the main body may be a thin film high dielectric coating, allowing for beam splitting.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A mirror assembly comprising:
   a main body that includes:
      a first portion having a first cut face and formed of a transparent material;
      a second portion having a second cut face and formed of the transparent material, wherein the second cut face is assembled to the first cut face to form the main body; and
      at least one reflective surface positioned between the first and second cut faces;
   a first support element and a second support element arranged to engage with and hold the main body therebetween;
   a first bearing element affixed to the first support element; and
   a second bearing element affixed to the second support element,
   wherein the first bearing element and the second bearing element are configured to enable rotation of the main body.

2. The mirror assembly of claim 1, further comprising a first mounting assembly engaged with an end of the first portion opposite the first cut face, wherein the first mounting assembly is arranged to engage within an image scanner, wherein the first mounting assembly includes the first support element and the bearing element.

3. The mirror assembly of claim 2, wherein the first portion comprises an engagement surface configured to engage the first portion to the first mounting assembly.

4. The mirror assembly of claim 2, wherein the first mounting assembly is configured for engagement with a driving element to enable rotation of the at least one reflective surface.

5. The mirror assembly of claim 2, further comprising a second mounting assembly engaged with an end of the second portion opposite the second cut face, wherein the second mounting assembly is arranged to engage within an image scanner, wherein the second mounting assembly includes the second support element and the second bearing element.

6. The mirror assembly of claim 1, wherein the first portion comprises a first window, wherein the mirror is arranged such that light can pass through an end of the first portion, reflect off the mirror, and pass through the first window.

7. The mirror assembly of claim 6, wherein the second portion comprises a second window, wherein the at least one reflective surface is arranged such that light may pass through an end of the second portion, reflect off the at least one reflective surface, and pass through the second window.

8. The mirror assembly of claim 1, wherein the at least one reflective surface is formed from at least one of a metallic coating and a di-electric coating.

9. The mirror assembly of claim 1, wherein the main body defines a cylindrical structure wherein curved surfaces of the cylindrical structure are at least one of treated, coated, and covered with absorbing material.

10. The mirror assembly of claim 1, wherein the first portion is attached to the second portion using at least one of glue, adhesive, optical bonding, mechanical clamps, and mechanical fasteners.

11. An imaging device comprising:
a housing; and
a mirror assembly installed within the housing, wherein the mirror assembly comprises:
   a first portion having a first cut face and formed of a transparent material;
   a second portion having a second cut face and formed of the transparent material, wherein the second cut face is assembled to the first cut face form a main body; and
   at least one reflective surface positioned between the first and second cut faces;
a first support element and a second support element arranged to engage with and hold the mirror assembly therebetween;
a first bearing element affixed to the first support element; and
a second bearing element affixed to the second support element,
wherein the first bearing element and the second bearing element are configured to enable rotation of the mirror assembly within the housing.

12. The imaging device of claim 11, further comprising a first mounting assembly engaged with an end of the first portion opposite the first cut face, wherein the first mounting assembly is arranged to engage within the housing, wherein the first mounting assembly includes the first support element and the bearing element.

13. The imaging device of claim 12, wherein the first portion comprises an engagement surface configured to engage the first portion to the first mounting assembly.

14. The imaging device of claim 12, wherein the first mounting assembly is configured for engagement with a driving element to enable rotation of the at least one reflective surface.

15. The imaging device of claim 12, further comprising a second mounting assembly engaged with an end of the second portion opposite the second cut face, wherein the second mounting assembly is arranged to engage within an image scanner, wherein the second mounting assembly includes the second support element and the second bearing element.

16. The imaging device of claim 15, further comprising at least one electromagnetic radiation device arranged to direct electromagnetic radiation at at least one of the first cut face and the second cut face.

17. The imaging device of claim 11, wherein the first portion comprises a first window, wherein the at least one reflective surface is arranged such that light can pass through an end of the first portion, reflect off the at least one reflective surface, and pass through the first window.

18. The imaging device of claim 17, wherein the second portion comprises a second window, wherein the at least one reflective surface is arranged such that light may pass through an end of the second portion, reflect off the at least one reflective surface, and pass through the second window.

19. The imaging device of claim 11, wherein the at least one reflective surface is formed from at least one of a metallic coating and a di-electric coating.

20. The imaging device of claim 11, wherein the mirror assembly defines a cylindrical structure wherein curved surfaces of the cylindrical structure are at least one of treated, coated, and covered with absorbing material.

21. The imaging device of claim 11, wherein the first portion is attached to the second portion using at least one of glue, adhesive, optical bonding, mechanical clamps, and mechanical fasteners.

22. The imaging device of claim 11, further comprising at least one electromagnetic radiation device arranged to direct electromagnetic radiation at the at least one reflective surface.

23. The imaging device of claim 22, wherein the at least one electromagnetic radiation device comprises a first electromagnetic radiation device arranged to direct electromagnetic radiation at a first side of the at least one reflective surface and a second electromagnetic radiation device arranged to direct electromagnetic radiation at a second side of the at least one reflective surface.

24. The imaging device of claim 23, wherein the first electromagnetic radiation device includes a coherent light generator and the second electromagnetic radiation device includes at least one of a color camera, a thermal camera, and a polarization camera.

* * * * *